Feb. 20, 1934. E. F. ROSSMAN 1,948,008
VALVE FOR SHOCK ABSORBERS
Filed June 26, 1931
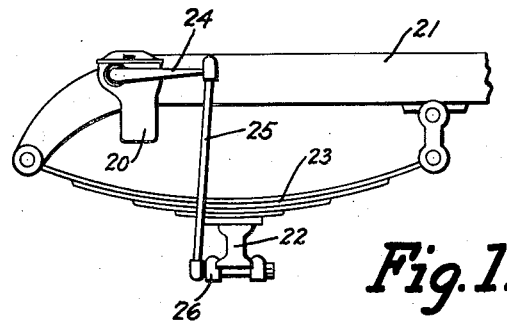
Fig. 1.
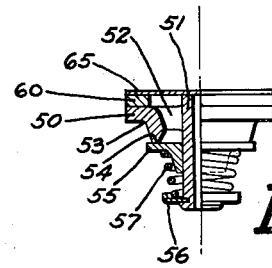
Fig. 3.
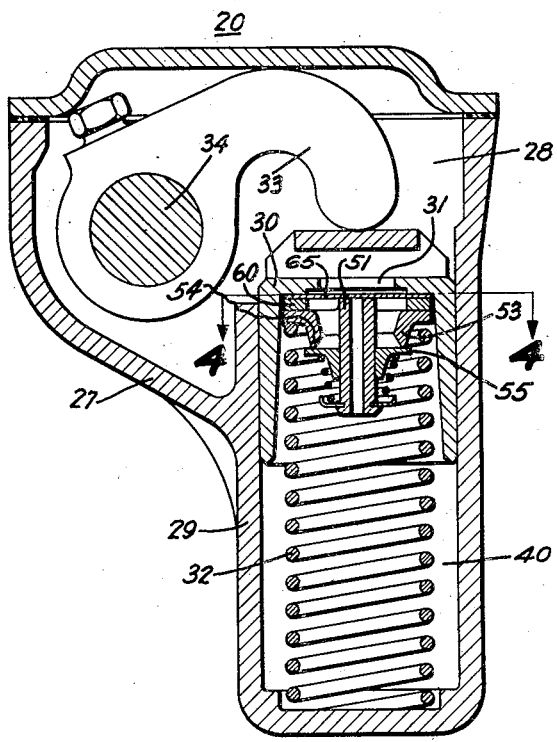
Fig. 2.
Fig. 4.
Inventor
Edwin F. Rossman
By Spencer, Hardman and Tehr
Attorneys Patented Feb. 20, 1934

1,948,008

UNITED STATES PATENT OFFICE 1,948,008

VALVE FOR SHOCK ABSORBERS

Edwin F. Rossman, Dayton, Ohio, assignor to Delco Products Corporation, Dayton, Ohio, a corporation of Delaware Application June 26, 1931. Serial No. 546,996

11 Claims. (Cl. 236—93)

This invention relates to improvements in fluid flow control devices particularly adapted for use in hydraulic shock absorbers.

It is among the objects of the present invention to provide a fluid flow control device of simple structure and design, capable of being adjusted automatically in response to temperature changes whereby to compensate for the change in the viscosity of the fluid due to such temperature changes.

Further objects and advantages of the present invention will be apparent from the following description, reference being had to the accompanying drawing wherein a preferred embodiment of one form of the present invention is clearly shown.

In the drawing:

Fig. 1 is a fragmentary side view of a vehicle chassis with a shock absorber equipped with the present invention attached thereto.

Fig. 2 is a longitudinal sectional view of the shock absorber.

Fig. 3 is a fragmentary sectional view of the fluid flow control device removed from the shock absorber piston.

Fig. 4 is a view taken along the line 4—4 of Fig. 2.

The fluid flow controlling device of the present invention is adapted to control the flow of fluid through a port in the piston. As the piston is moved in the one direction in response to approaching movement of the frame and axle of the vehicle, said device is adapted to establish a substantially free flow of fluid through said port and when moved in the other direction by the separating movement of the frame and axle the fluid flow control device is adapted to restrict the flow of fluid through the piston port, whereby the movement of the piston is resisted and thereby this separating movement of the frame and axle is retarded.

The shock absorber designated by the numeral 20 is secured to the frame 21 of the vehicle, said frame being supported upon the vehicle axle 22 by springs 23. The shock absorber has an operating arm 24, the end of which is swivelly attached to one end of a link 25, the opposite end of said link being swivelly secured to a bracket 26 attached in any suitable manner to the axle 22.

The shock absorber 20 comprises a casing 27 providing a fluid reservoir 28 and a cylinder 29. Within the cylinder there is provided a piston 30 having a port 31 adapted to establish flow of fluid from one side of the piston to the other in response to its reciprocation. A spring 32 interposed between the piston and the bottom end wall of the cylinder 29 urges the piston upwardly in one direction against an operating arm 33 which is attached to the rocker shaft 34 forming a part of the operating arm 24 outside the shock absorber.

The fluid flow through the port 31 in the piston is controlled in accordance with the movement of the piston. When the axle 22 is moved upwardly by striking obstructions in the roadway, springs 23 are compressed and link connection 25 will operate levers 24 and 33 in a counter-clockwise direction as regards Figs. 1 and 2, and thus spring 32 will move the piston 30 upwardly in the cylinder to follow the movement of arm 33. Under these circumstances a substantially free flow of fluid is established from the reservoir through the piston port 31 into the chamber 40 of the cylinder 29.

The rebounding movement of spring 23 is likewise controlled. As arms 24 and 33 are moved clockwise through the link connection 25 with the axle 22, the piston 30 is pushed downwardly into the cylinder 29, thereby exerting a pressure upon the fluid within the chamber 40 in said cylinder, causing the fluid to be forced back through the piston passage 31 into the reservoir 28. This return flow of fluid is restricted to resist the downward movement of piston 30, thereby to control the rebounding movements of springs 23.

The fluid flow controlling device of the present invention provides the proper control of the flow of fluid through the piston passage 31 in both directions.

This device comprises a member 50 consisting of a tubular nozzle 51 having ribbed portions 52 radiating from its outer surface, said ribbed portions supporting an annulus 53 substantially concentric with the tubular part 51. The annulus 53 has a sharp, annular edge on its one side providing a valve-seat 54.

The valve which is adapted to establish a substantially free flow of fluid through the piston passage 31, as the piston 30 is moved upwardly in the cylinder, is designated by the numeral 55, this valve being slidably supported upon the tubular part 51 as shown in Figs. 2 and 3. At the lower end of the tubular part 51 there is provided an abutment collar 56 secured thereto in any suitable manner. A spring 57 rests upon this abutment collar 56. The opposite end of said spring engages the valve 55 and yieldably maintains said valve in engagement with the annular valve-seat 54.

The portion of the valve which restricts the flow of fluid through the piston passage 31 as the piston 30 is moved downwardly into the cylinder 29 in response to rebounding movements of the vehicle spring 23, comprises a ring 60 which is slidably supported upon the surface of the annulus 53 on the side opposite the valve-seat 54. This ring 60 is preferably of a metal having a substantially high coefficient of expansion so that, at increasing temperatures said ring will enlarge in diameter, while at decreasing temperatures the diameter thereof decreases. A spring-blade valve 65, narrower than the inside diameter of the ring 60, extends centrally across the ring and has its ends 66 and 67 secured in diametrically opposite recesses 60a provided in one surface of the ring in any suitable manner such as by spot welding or the like. Setting the ends of the spring-blade valve 65 into recesses in the ring brings the upper surfaces of the valve and ring flush so as to provide a seal when the ring is pressed against the inner surface of the piston head. Ring 60 is of such a thickness that, when resting upon the annulus 53 the spring-blade valve 65 will seat upon the upper end of the tubular part or nozzle 51, thereby closing the upper end of its passage and thus restricting the flow of fluid through this nozzle or annular part 51 as the piston 30 moves downwardly into the cylinder 29.

If the temperature increases, ring 60 will expand, increasing the tension of the spring-blade valve 65 and thus increasing the pressure of its engagement with the upper end of the nozzle or tubular part 51, thereby requiring a greater fluid pressure to lift said valve from the nozzle to establish a restricted flow of fluid through the piston passage 31. On the other hand, if the temperature decreases, thereby increasing the viscosity of the fluid within the shock absorber, then the ring 60 will contract, tending to buckle the spring-blade valve 65 and thus decrease the pressure of its engagement with the nozzle 51, or even slightly lift said spring blade 65 from the nozzle 51 thereby decreasing the restriction to the flow of fluid, or more specifically requiring a lesser fluid pressure to establish the restricted flow through the piston port 31.

In Fig. 2 it will be seen that the one end of spring 32 engages the annulus 53, clamping the ring 60 and its spring-blade valve 65 against the inner wall of the piston head 30, thereby maintaining the valve assembly in proper position in the piston.

In the present invention applicant has provided a simple, compound fluid flow controlling device which, in accordance with temperature changes will automatically compensate for the changes in the viscosity of the fluid caused by said temperature changes.

While the form of embodiment of the present invention as herein disclosed constitutes a preferred form it is to be understood that other forms might be adopted, all coming within the scope of the claims which follow.

What is claimed is as follows:

1. A fluid flow control device comprising, in combination, a nozzle; means engaging the nozzle for restricting the flow of fluid therethrough; and a support to diametrically opposite portions of which the respective ends of said means are secured, said support being adapted, in response to temperature variations, to exert more or less pull on said means to adjust the contact pressure of said means upon the nozzle.

2. A fluid flow control device comprising, in combination, a nozzle; a resilient blade member engaging the end of the nozzle normally to close it; and temperature affected means to diametrically opposite sides of which the respective ends of said blade are attached, said means being adapted, in response to variations in temperature, to change the tension of the resilient member for varying the contact pressure of the resilient member with the nozzle.

3. A fluid flow control device comprising, in combination, a nozzle; a spring blade; a ring supporting said spring blade so it normally engages the end of the nozzle, said ring being subject to expansion and contraction in response to increasing and decreasing temperatures respectively whereby the tension of the spring is increased or decreased and the pressure of its contact with the nozzle is correspondingly increased or decreased.

4. A fluid flow control device comprising, in combination, a nozzle; a spring blade of metal having substantially no coefficient of expansion, a metal ring having a comparatively great coefficient of expansion and to which the ends of the spring blade are attached so that the ring normally maintains said spring blade against the end of the nozzle, expansion of the ring increasing the tension of the spring blade and therefore the pressure of its engagement with the nozzle in response to increasing temperatures.

5. A device for controlling fluid flow in two directions comprising, in combination, a member providing an annular valve seat and a tubular portion centrally of said valve-seat; a valve slidably supported on said tubular portion and yieldably urged against said valve-seat; a metallic ring on said member; a strip of resilient material having its ends secured to said ring, said strip normally engaging the end of the tubular member to hold it closed, the tension of the strip and therefore the pressure of its contact with the tubular member being varied by the expansion or contraction of the metallic ring in accordance with temperature changes.

6. A device for controlling the flow of fluid in two directions comprising, in combination, a tubular nozzle having outwardly extending web members supporting an annulus substantially concentric of said nozzle; a valve seat provided on one side of said annulus; a valve slidably carried on said nozzle and yieldably urged into engagement with the valve-seat; a metallic ring, having a relatively high coefficient of expansion movably supported on the side of the annulus opposite the valve-seat; a resilient, metallic strip, having a lower coefficient of expansion than said ring, extending across the ring, the strip being narrower than the interior diameter of the ring and the ends thereof being attached to opposite sides of the ring, said strip normally engaging the end of the nozzle to close it, expansion and contraction of the ring varying the tension of the strip in response to temperature changes whereby the pressure of its contact with the nozzle is changed.

7. A two-way fluid flow control device comprising, a member having a plurality of fluid flow passages; means adapted to establish a flow of fluid in one direction only through one of said passages; means engaging said member for restricting the flow of fluid in the opposite direction through the other of said passages; and a support for said last mentioned means adapted, in response to temperature variations, to adjust the contact pressure of said means with said member.

8. A two-way fluid flow control device comprising, a member having a plurality of fluid flow passages; spring loaded means adapted to establish a flow of fluid through one of said passages in one direction only; resilient means engaging said member, normally closing the other of said passages and adapted to establish a flow through this passage only in a direction opposite to the flow in the first mentioned passage; and means adapted, in response to temperature variations, to change the tension of the resilient means for varying its contact pressure with said member.

9. A two-way fluid flow control device comprising, a member having a central tubular portion and apertures about said portion; an annular valve-seat about said apertures; a valve yieldably urged against said valve-seat to close said apertures; a resilient member engaging one end of said tubular portion to close it; and a support for said resilient member adapted, in response to temperature changes, to vary the contact pressure of said resilient member upon said tubular portion.

10. A two-way fluid flow control device comprising, in combination, an annulus having an annular ridge on its one side providing a valve-seat; a tubular member supported coaxially of said annulus; a valve slidably supported on said tubular member and yieldably urged against the valve-seat; a resilient member normally engaging the one end of the tubular member to close it, but not closing the annulus; and a support for the resilient member, carried by the annulus, said support being responsive to temperature changes to vary the contact pressure of the resilient member upon the tubular member.

11. A two-way fluid flow control device comprising, in combination, an annulus having a ridge on its one side providing a valve-seat; a tubular member supported coaxially of said annulus, the ends of said tubular member extending beyond the both surfaces of the annulus; a valve slidably supported on the tubular member and yieldably urged upon the valve-seat; a metallic ring carried upon the side of the annulus opposite the said valve, said ring being capable of varying its diametral dimensions in response to temperature variations; and a resilient blade secured at each end to said ring and normally engaging the tubular member to close it, the contact pressure of said blade upon said tubular member varying with the variations in the diameter of said ring.

EDWIN F. ROSSMAN.